N. M. LESIUK.
BREAD CUTTING MACHINE.
APPLICATION FILED JUNE 5, 1920.
1,355,483.
Patented Oct. 12, 1920.
2 SHEETS—SHEET 1.
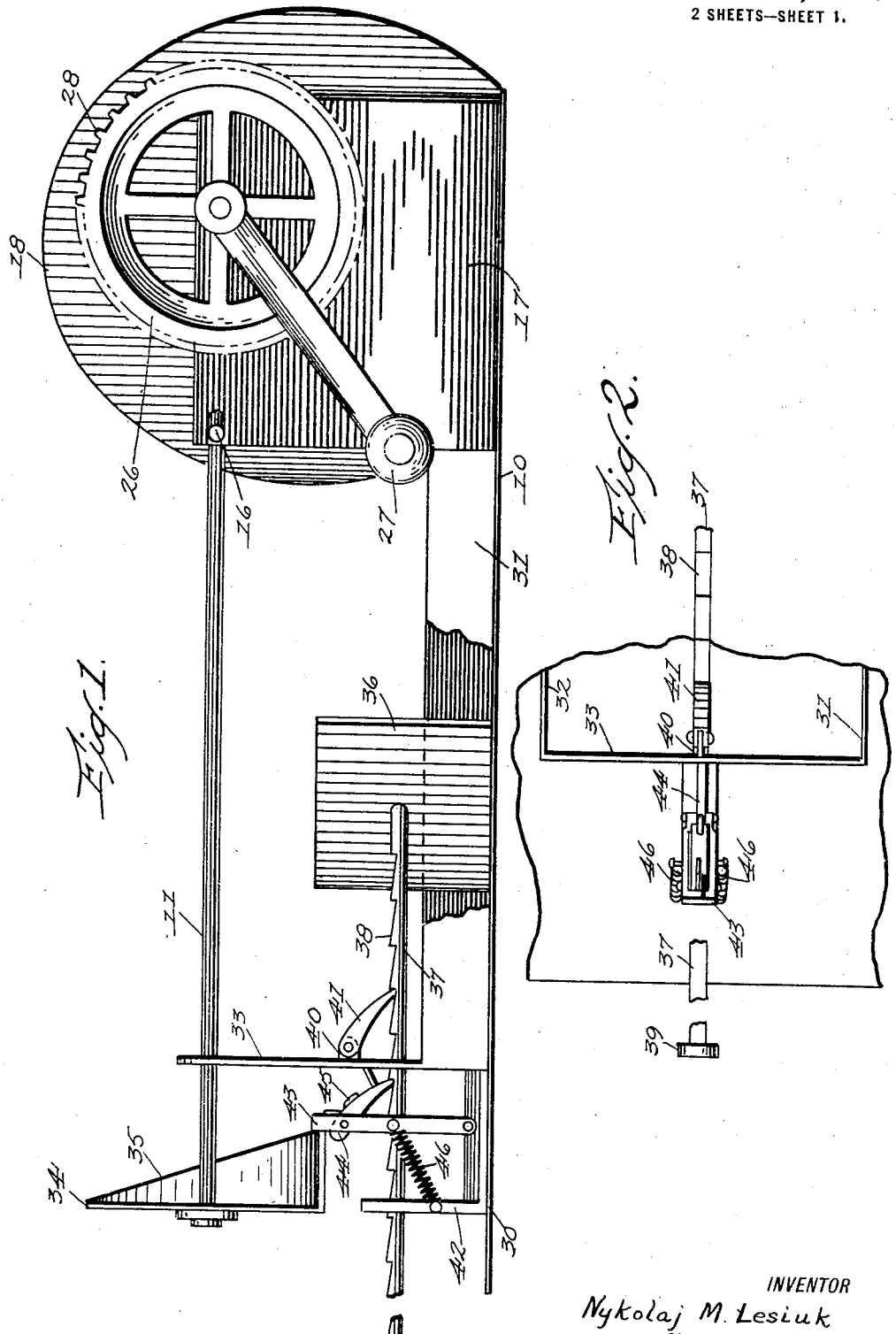
INVENTOR
Nykolaj M. Lesiuk
BY
George C. Heinicke
ATTORNEY N. M. LESIUK.
BREAD CUTTING MACHINE.
APPLICATION FILED JUNE 5, 1920.
1,355,483.
Patented Oct. 12, 1920.
2 SHEETS—SHEET 2.
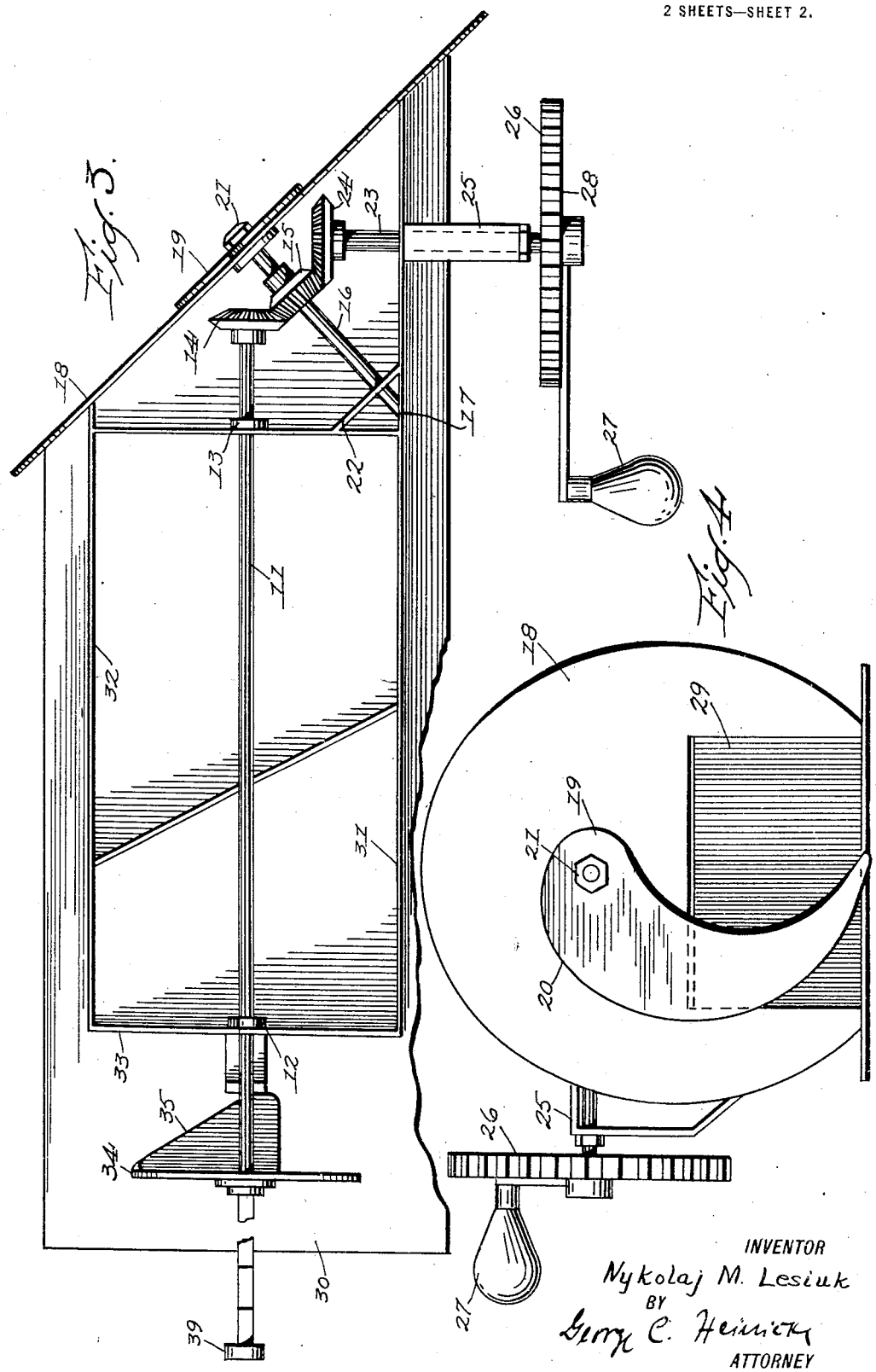
INVENTOR
Nykolaj M. Lesiuk
BY
George C. Heinrich
ATTORNEY

UNITED STATES PATENT OFFICE.

NYKOLAJ M. LESIUK, OF NEW YORK, N. Y.

BREAD-CUTTING MACHINE.

1,355,483.   Specification of Letters Patent.   Patented Oct. 12, 1920.

Application filed June 5, 1920. Serial No. 386,911.

*To all whom it may concern:*

Be it known that I, NYKOLAJ M. LESIUK, a citizen of Ukrainia, residing at New York, county of New York, and State of New York, have invented certain new and useful Improvements in Bread-Cutting Machines, of which the following is a specification.

This invention relates to improvements in bread cutters, particularly of the rotary type, and it is the principal object of the invention to provide a machine in which the bread to be sliced is obliquely cut in order to obtain large slices and in which the bread is uniformly and evenly fed to the slicer.

Another object of the invention is to construct a machine for rapidly and effectively slicing or cutting bread in which the feeding device for the bread to be cut is operated simultaneously with the cutter.

A still further object of the invention is to produce a rotary cutter in which the feeding device can be readily reset for feeding a new loaf to the cutter after one loaf of bread has been cut.

The invention further consists of novel details of construction, as will be hereinafter more fully set forth, and particularly pointed out in the appended claims.

In the accompanying drawings—

Figure 1 is a perspective view of a machine constructed according to the present invention, partly broken away.

Fig. 2 is a top plan view of the feeding device.

Fig. 3 is a top plan view of the machine, and

Fig. 4 is a front end view of the same.

Similar letters of reference indicate corresponding parts in all the figures.

Referring to the drawings more particularly, 10 indicates the frame of the machine, on top of which the rotary shaft 11 is mounted in bearings 12 and 13. The front end of the shaft is extended beyond the bearing 13 and carries a bevel gear 14 in mesh with another bevel gear 15 upon a shaft 16 intermediate the ends thereof. The rear end of the shaft 16 is supported in the side wall 17 of the frame as shown in Fig. 1, while its front end is secured to an obliquely disposed front plate 18 through which it is extended and carries the knife or cutter 19 of substantially the contour seen best in Fig. 4 with the cutting edge 20.

A nut 21 holds the cutter in position on the shaft without however interfering with its free rotation with the shaft 16. While the shaft 16 is set at an angle to the side part of the frame underneath a brace 22 thereof, a stub shaft 23 is set in the side wall 17 of the frame at a right angle thereto and carries at its free end a bevel gear 24 in mesh with the bevel gear 15. The outer end of the stub shaft 23 is extended beyond the side face of the frame and through a supporting bracket 25 thereof and carries a wheel 26 adapted to be rotated by a handle 27. The outer periphery of the wheel 26 can also be provided, for instance as shown, with gear teeth 28 which may be engaged by suitable gear teeth of a wheel on the shaft of a motor or the like, if it is desired to operate the cutter by other than manual power. As shown in Fig. 4 the obliquely disposed front plate 18 has a square opening 29 in the lower part of its face through which the bread is fed to the knife. The frame 10 comprises a bottom plate 30 upon which two vertical side strips 31 and 32 are mounted which form a guideway for the bread and which are secured with their front ends to the front part of the side wall of the frame, and with their rear ends to a bracket 33 carrying at its upper end the bearing 12 for the shaft 11. The rear end of this shaft 11 is extended beyond this bracket 33 and carries a disk 34 to the periphery of which a deflecting member 35 is secured or made integrally therewith of a contour best shown in Fig. 1. Between the strips or guide-bars 31 and 32 a feeding plate 36 for the loaf of bread to be cut is slidable to which in approximately the center thereof, a shaft 37 is secured which carries at its upper face a plurality of inclined or obliquely disposed teeth 38, the width of which is equal to the width of the slices to be cut. The outer end of the shaft 37 is slidable through the lower part of the bracket 33 underneath the shaft 11 and carries at its extreme end a limiting stop knob 39. To the inner face of the bracket 33 above the shaft 37 a projection 40 is secured to which is pivotally secured the upper end of a pawl 41, the lower end of which is normally engaging the teeth 38 of the shaft 37. To the rear face of the bracket 33 another bracket 42 is secured provided at the free upper end of one of its arms with an opening for the passage of the shaft 37, while to the side edges of the second horizontal arm of the bracket 42 a forked member 43 is pivotally secured with its lower end having above the fork a longitudinal slot in which the upper end of a pawl 44 is pivotally secured, the lower end of which is normally resting upon the toothed face of the shaft 37 while a projection or nose 45 at the upper edge of the pawl is adapted at times to engage the outer face of the bracket 33. Springs 46 are secured to both sides of the shaft 37 with their lower ends secured to the vertical arm of the bracket 42 and with their upper ends to the outer edges of the member 43 intermediate its ends.

The operation of the device is as follows:

The bread to be cut is placed in the guideway formed by the bars 31 and 32 with its rear end resting against the outer face of the plate 36. By manipulating the handle 27 the shaft 11 is rotated and with it the disk 34, which will engage with its peripheral deflecting member 35, the increasing width of which will gradually press the upper end of the member 43 toward the outer face of the bracket 33 against the tension of the springs 46, so that the lower end of the pawl 44 will advance the shaft 37 for one tooth, at which time the nose 45 of the pawl will engage the outer face of the bracket 33 while the member 35 will have passed the member 43 which now becomes free and returns to its normal position under the action of the springs 46. The pawl 41 during this operation will slide idly over the teeth of the shaft 37 but will effectively prevent a backward sliding of the shaft. After a loaf of bread has been sliced, and it is desired to return the plate 36 into its normal position, so that a new loaf may be inserted in the guideway, pawls 41 and 44 must be lifted manually out of engagement with the teeth on top of the shaft 37.

From the foregoing description it will be clear that upon the more or less rapid manipulation of the handle the bread will be fed through the front opening of the oblique plate 18 to the knife and will be cut by the same, as it is rotating with the shaft 16, into slices of a thickness equal to the length of the teeth 38 on shaft 37. The oblique plate will allow the cutting of slices of the greatest dimension possible.

Having thus described my invention what I claim as new and desire to secure by Letters Patent of the United States is as follows—

1. In a bread cutter of the character described, the combination with a frame, of an oblique front plate having an opening, an upper rotary shaft mounted in said frame, a bevel gear on the front end of said shaft, a shaft rectangularly disposed to said oblique plate, and extended therethrough, a rotary cutter mounted on the front end of said shaft, a gear on said shaft, intermediate the ends thereof meshing with said first named gear, a stub shaft also mounted in said frame, and extended therethrough, a gear on said stub shaft, in mesh with said second gear, and an operating hand wheel on said stub shaft, means connected with said first named shaft to advance a loaf of bread to be cut through the opening of said front plate, upon the operation of said hand wheel, for operating said knife.

2. In a bread cutter of the character described a rotary knife and a bread feeding means comprising a bracket, a horizontal rotary upper shaft mounted in and extended through said bracket, a disk at the outer extended end of said shaft, a deflecting member integral with the periphery of said disk, a lower horizontal shaft sliding through said bracket, a stop at the outer end of said lower shaft, a plurality of inclined teeth upon the upper face of said lower shaft, a two armed bracket secured to the outer face of said first named bracket, a forked and slotted element pivotally secured with its lower end to one arm of said second bracket, a pawl pivotally secured in the slot of said element and engaging the teeth of said lower shaft, a nose on said pawl adapted to engage with the outer face of said bracket shortly before the release of said member by the deflecting member, springs for returning said element into its normal position upon its disengagement by said deflecting member and a pawl at the front face of said first named bracket, normally engaging the teeth of said second shaft, and means for simultaneously operating said cutter and said lower feeding means.

In testimony whereof I have affixed my signature.

NYKOLAJ M. LESIUK.